United States Patent
Maeyama

(10) Patent No.: US 9,678,268 B2
(45) Date of Patent: Jun. 13, 2017

(54) DISPLAY DEVICE

(71) Applicant: Panasonic Liquid Crystal Display Co., Ltd, Hyogo (JP)

(72) Inventor: Tomohiro Maeyama, Osaka (JP)

(73) Assignee: Panasonic Liquid Crystal Display Co., Ltd, Hyogo (JP)

( * ) Notice: Subject to any disclaimer, the term of this patent is extended or adjusted under 35 U.S.C. 154(b) by 100 days.

(21) Appl. No.: 14/439,122

(22) PCT Filed: Nov. 25, 2013

(86) PCT No.: PCT/JP2013/006917
§ 371 (c)(1),
(2) Date: Apr. 28, 2015

(87) PCT Pub. No.: WO2014/118841
PCT Pub. Date: Aug. 7, 2014

(65) Prior Publication Data
US 2015/0285988 A1 Oct. 8, 2015

(30) Foreign Application Priority Data
Feb. 4, 2013 (JP) ................................. 2013-019850

(51) Int. Cl.
*G02B 6/42* (2006.01)
*F21V 8/00* (2006.01)
(Continued)

(52) U.S. Cl.
CPC ........... *G02B 6/0085* (2013.01); *G02B 6/009* (2013.01); *G02B 6/0065* (2013.01);
(Continued)

(58) Field of Classification Search
CPC .. G02B 6/0085; G02B 6/0068; G02B 6/4269; G02F 2001/133314
See application file for complete search history.

(56) References Cited

U.S. PATENT DOCUMENTS

| 2004/0141322 A1* | 7/2004 | Liao ...................... F21V 29/004 362/294 |
| 2005/0141244 A1* | 6/2005 | Hamada ............... G02B 6/0068 362/612 |

(Continued)

FOREIGN PATENT DOCUMENTS

| JP | 2006-154136 A | 6/2006 |
| JP | 2008-299181 A | 12/2008 |

(Continued)

OTHER PUBLICATIONS

International Search Report issued in PCT/JP2014/001417, dated Jun. 10, 2014, with English translation.

(Continued)

*Primary Examiner* — Andrew Coughlin
(74) *Attorney, Agent, or Firm* — McDermott Will & Emery LLP

(57) ABSTRACT

A display device includes a lower frame arranged on a side opposite to a display surface of a display panel. The lower frame includes a bottom wall portion, and a side wall portion that is formed so as to surround the bottom wall portion at an edge thereof. The display device also includes a plurality of light sources arranged along the side wall portion of the lower frame and a heat sink configured to dissipate heat generated from the plurality of light sources. The heat sink includes a plurality of groove portions that are formed along the bottom wall portion in a direction extending from the plurality of light sources.

10 Claims, 5 Drawing Sheets

(51) Int. Cl.
    *G02F 1/1333* (2006.01)
    *G02F 1/1335* (2006.01)
(52) U.S. Cl.
    CPC ......... *G02B 6/0068* (2013.01); *G02B 6/0073* (2013.01); *G02F 1/133308* (2013.01); *G02F 2001/133314* (2013.01); *G02F 2001/133628* (2013.01)

(56) References Cited

U.S. PATENT DOCUMENTS

| | | | |
|---|---|---|---|
| 2008/0024694 A1* | 1/2008 | Kondo | G02B 6/0085 349/58 |
| 2009/0128757 A1 | 5/2009 | Koshihara et al. | |
| 2010/0207866 A1 | 8/2010 | Kunii | |
| 2011/0085121 A1 | 4/2011 | Jeon et al. | |
| 2011/0128756 A1 | 6/2011 | Cho et al. | |
| 2011/0205478 A1 | 8/2011 | Nakahara et al. | |
| 2012/0287355 A1* | 11/2012 | Oya | G02B 6/0031 348/790 |
| 2013/0051077 A1 | 2/2013 | Cho et al. | |
| 2014/0119054 A1 | 5/2014 | Cho et al. | |

FOREIGN PATENT DOCUMENTS

| | | |
|---|---|---|
| JP | 2009-122569 A | 6/2009 |
| JP | 2011-081385 A | 4/2011 |
| JP | 2011-119218 A | 6/2011 |
| JP | 2012-027046 A | 2/2012 |
| JP | 2012-093490 A | 5/2012 |
| JP | 2012-242796 A | 12/2012 |
| WO | 2009-081618 A1 | 7/2009 |

OTHER PUBLICATIONS

International Search Report issued in PCT/JP2013/006917, dated Jan. 7, 2014, with English translation.

* cited by examiner

DISPLAY DEVICE

RELATED APPLICATIONS

This application is the U.S. National Phase under 35 U.S.C. §371 of International Application No. PCT/JP2013/006917, filed on Nov. 25, 2013, which in turn claims the benefit of Japanese Application No. 2013-019850, filed on Feb. 4, 2013, the disclosures of which Applications are incorporated by reference herein.

TECHNICAL FIELD

The present invention relates to a display device.

BACKGROUND ART

In general, in liquid crystal display devices, in order to dissipate heat generated from a light source such as a light emitting diode, there are known a technology of arranging a metal radiator plate on a back surface of a substrate on which the light source is arranged, and a technology of forming heat conductive tape on the back surface of the substrate (see Patent Literature 1).

CITATION LIST

Patent Literature

[PTL 1] JP 2011-119218 A

SUMMARY OF INVENTION

Technical Problem

However, in the case where the radiator plate or the like is provided in the vicinity of the light source as described above, the heat generated from the light source experiences convection in the vicinity of the light source so that the characteristics and the life of the light source are adversely affected.

In view of the above-mentioned problem, an object of one or more embodiments of the present invention is to provide a display device capable of improving reliability of a light source element by decreasing temperature of a vicinity of a light source.

Solution to Problem (1) A display device includes a lower frame arranged on a side opposite to a display surface of a display panel. The lower frame includes a bottom wall portion, and a side wall portion that is formed so as to surround the bottom wall portion at an edge thereof. The display device also includes a plurality of light sources arranged along the side wall portion of the lower frame and a heat sink configured to dissipate heat generated from the plurality of light sources. The heat sink includes a plurality of groove portions that are formed along the bottom wall portion in a direction extending from the plurality of light sources.

(2) In the display device according to Item (1), the heat sink further includes a side portion formed along the side wall portion of the lower frame, and a bottom portion formed along the bottom wall portion. The plurality of groove portions are formed at the bottom portion.

(3) In the display device according to Item (1) or (2), each of the plurality of groove portions has a rectangular cross-sectional shape.

(4) In the display device according to Item (1) or (2), each of the plurality of groove portions has a cross-sectional shape. A depth of the cross-sectional shape becomes larger toward a center thereof.

(5) In the display device according to Item (4), each of the plurality of groove portions has a triangular cross-sectional shape.

(6) In the display device according to any one of Items (1) to (5), each of the plurality of groove portions has a cross-sectional shape. A width of the cross-sectional shape becomes larger as being further away from the plurality of light sources.

(7) In the display device according to any one of Items (1) to (6), the bottom wall portion of the lower frame includes a plurality of protruding portions and a plurality of recessed portions.

(8) In the display device according to Item (7), a bottom portion of the heat sink is formed to extend to a predetermined recessed portion among the plurality of recessed portions.

(9) In the display device according to any one of Items (1) to (8), the bottom portion of the heat sink further includes an intersecting groove portion that intersects with the plurality of groove portions.

DESCRIPTION OF EMBODIMENTS

Figure 1:
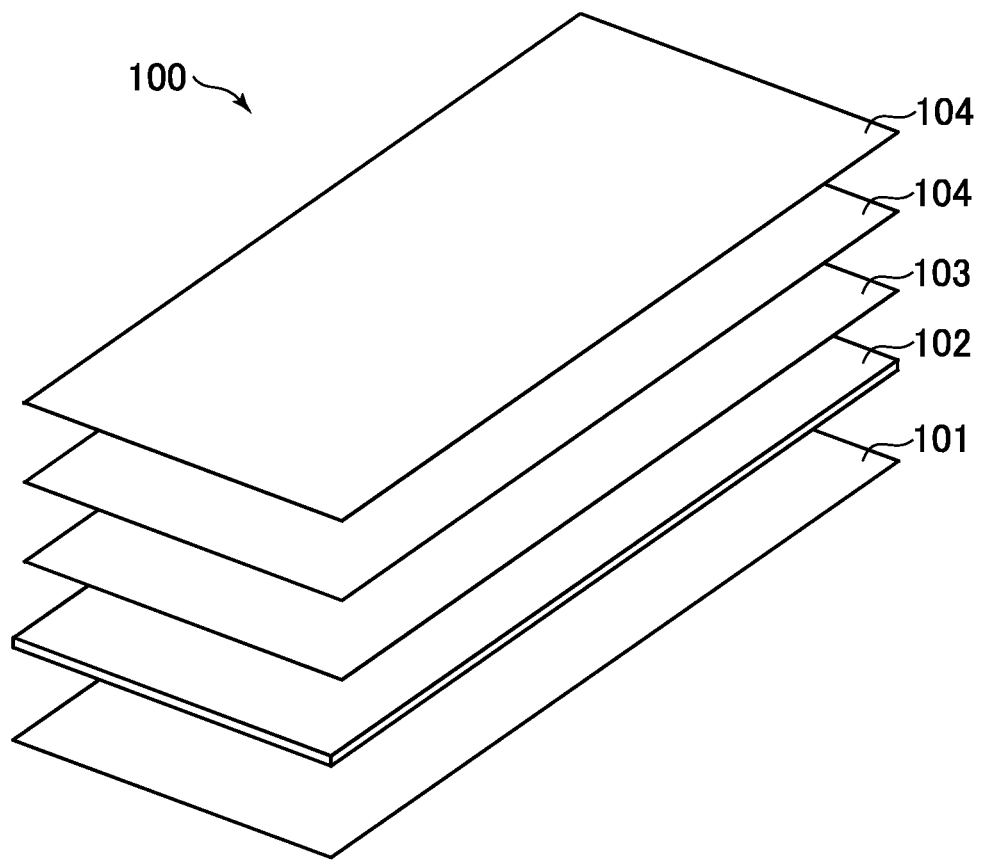
FIG. 1 is a diagram schematically illustrating a backlight device of a display device according to an embodiment of the present invention.

Referring to the accompanying drawings, an embodiment of the present invention is described below. In the drawings, the same or similar components are denoted by the same reference symbols, and repetitive description thereof is omitted.

FIG. 1 is a diagram schematically illustrating a backlight device of a display device according to an embodiment of the present invention. As illustrated in FIG. 1, a backlight device 100 includes, for example, a reflective sheet 101, a light guide plate 102, a diffusion sheet 103, a plurality of prism sheets 104, and light sources (not shown).

The light sources (not shown) are arranged along a side surface of the light guide plate 102. Specifically, for example, the light sources are arranged along one of the four side surfaces of the light guide plate 102. Note that, a positional relationship between the arrangement of the light sources and the light guide plate 102, and the like are further described later.

As described later, the light sources include, for example, a plurality of light emitting diodes (LEDs), and are arranged and aligned on a substrate (not shown). Light entering the light guide plate 102 from the light sources is totally reflected in the light guide plate 102 repeatedly, and exits from an upper surface (light exit surface) of the light guide plate 102. The reflective sheet 101 is arranged to be overlapped on the light guide plate 102, and reflects light exiting from a back surface of the light guide plate 102 to the light guide plate 102.

The diffusion sheet 103 is, for example, a film coated with a light diffusing resin, and diffuses light exiting from a front surface of the light guide plate 102. Each of the prism sheets 104 is a film on which a prism or a lens is formed on its surface, and condenses light exiting from the diffusion sheet 103 in a direction perpendicular to the light emission surface.

Figure 2:
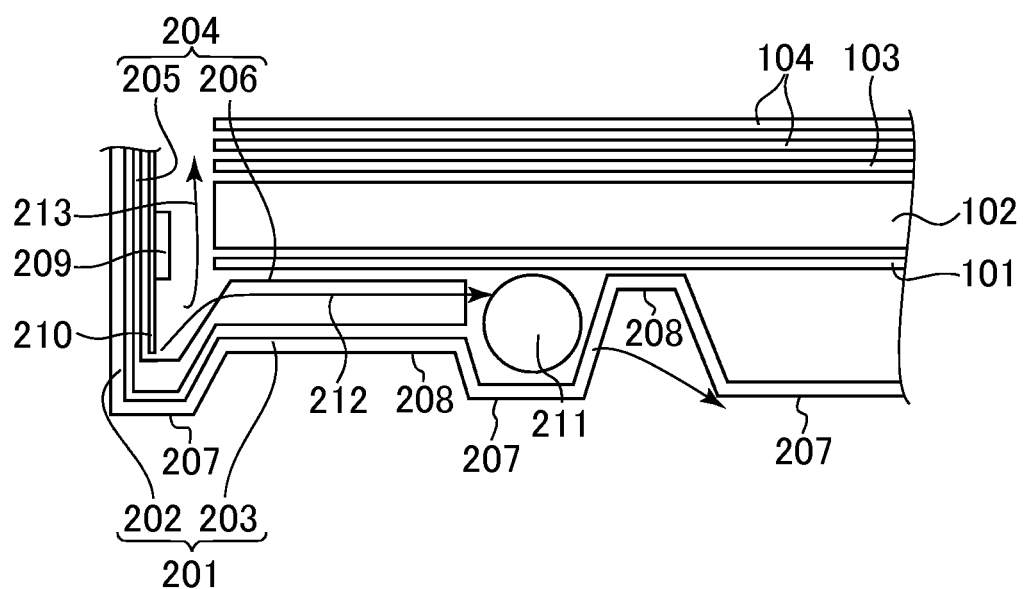
FIG. 2 is a diagram schematically illustrating a cross-sectional configuration of the display device in the vicinity of the backlight device illustrated in FIG. 1.

FIG. 2 is a diagram schematically illustrating a cross-sectional configuration of the display device in the vicinity of the backlight device illustrated in FIG. 1. Note that, for simple description, FIG. 2 schematically illustrates a main configuration in a part of the vicinity of mainly the backlight device 100, and the illustration of a display panel and the like that are arranged to be overlapped on the backlight device 100 is omitted.

As illustrated in FIG. 2, in the display device according to this embodiment, a heat sink 204 and the backlight device 100 are housed in a lower frame 201. For example, the lower frame 201 is formed of a side wall portion 202, which is formed along the shape of a casing of the display device, and a bottom wall portion 203, which is located on the side opposite to a display surface of the display device. As illustrated in FIG. 2, for example, the side wall portion 202 is formed so as to surround the bottom wall portion 203 at an edge of the bottom wall portion 203. Note that, the lower frame 201 is formed of, for example, a metal such as Al and Cu.

Further, the bottom wall portion 203 of the lower frame 201 includes, depending on the shape of the casing of the display device, protruding portions 207 and recessed portions 208 that have protrusions and recesses on the side opposite to the display surface. For example, the lower frame 201 is fixed by screws to the casing of the display device at the protruding portions 207.

Specifically, for example, as illustrated in FIG. 2, the lower frame 201 includes the protruding portion 207, the recessed portion 208, the protruding portion 207, the recessed portion 208, and the protruding portion 207 having different heights in this order, for example, in the direction from the side wall portion 202 toward the inside of the display device. For example, the recessed portions 208 are formed to have different depths, and the protruding portions 207 are formed to have different widths. Note that, the above-mentioned shapes of the protruding portions 207 and the recessed portions 208 are merely examples, and, for example, the protruding portions 207 and the recessed portions 208 may be formed into different shapes depending on the shape of the casing of the display device and the like.

A plurality of light sources 209 are arranged along the side surface of the light guide plate 102. For example, the plurality of light sources 209 are formed of a plurality of light emitting diodes (LEDs) that are arranged in a line. The plurality of light sources 209 are arranged on a substrate 210, and the substrate 210 is arranged along the side wall portion 202 of the lower frame 201.

The heat sink 204 includes a side portion 205 formed along the side wall portion 202 of the lower frame 201 and a bottom portion 206 formed along the bottom wall portion 203 of the lower frame 201. The side portion 205 is arranged substantially in parallel to the substrate 210. The bottom portion 206 extends along the lower frame 201 to a predetermined position.

Specifically, for example, in the case illustrated in FIG. 2, the bottom portion 206 of the heat sink 204 extends to a portion of the lower frame 201 (air gap portion 211) at which the protruding portion 207 is formed and which accumulates heat, so as to transfer the heat generated from the light sources 209 to this portion. When viewed from above in FIG. 2, the bottom portion 206 of the heat sink 204 extends so as to overlap with a part of the light guide plate 102. In other words, the bottom portion 206 is arranged along the light guide plate 102 in parallel to a part of the light guide plate 102. Note that, the heat accumulated in the air gap portion 211 is schematically illustrated by the circle in FIG. 2 for easy understanding. The lower frame 201 and the heat sink 204 may be formed so as to be brought into direct contact with each other, or formed so as to be brought into contact with each other via silicon-based grease.

Figure 3:
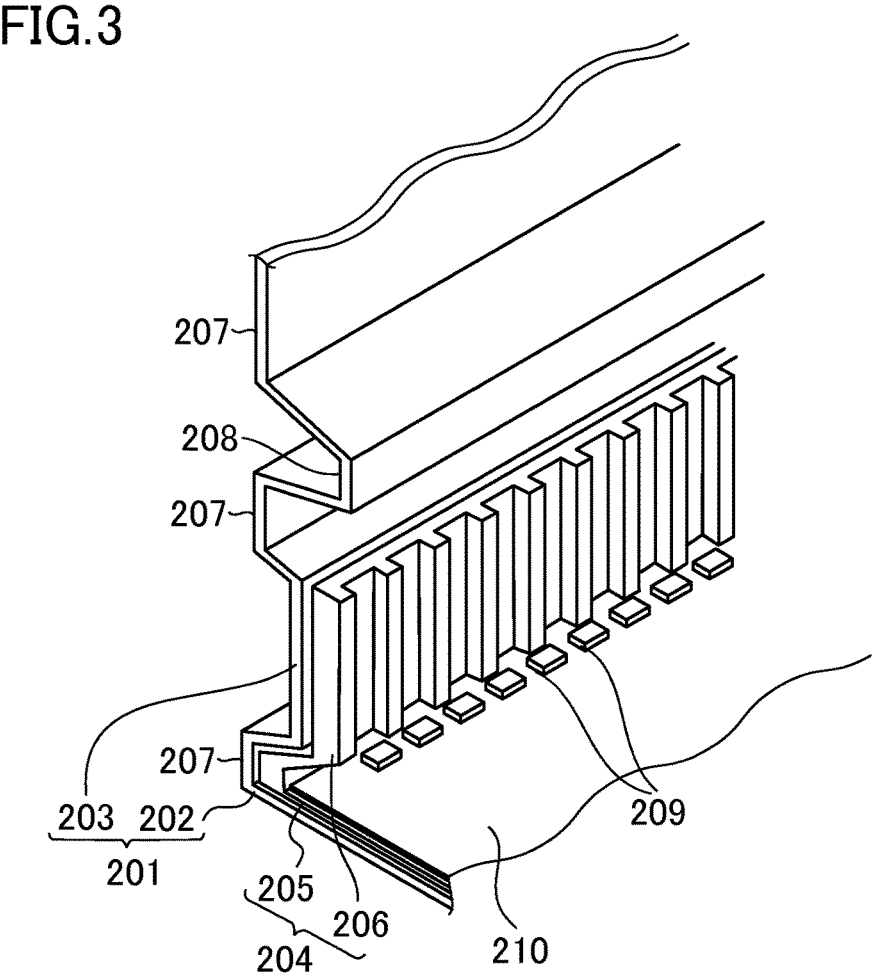
FIG. 3 is a perspective diagram schematically illustrating a part of the vicinity of a heat sink illustrated in FIG. 2.
Figure 4:
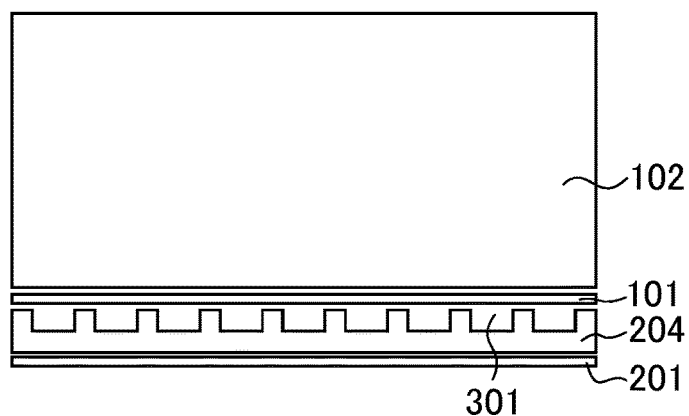
FIG. 4 is a diagram schematically illustrating the vicinity of the heat sink as viewed from the X direction of FIG. 2.

Next, a more specific configuration of the heat sink 204 is described. FIG. 3 is a perspective diagram schematically illustrating a part of the vicinity of the heat sink 204 illustrated in FIG. 2. FIG. 4 is a diagram schematically illustrating the vicinity of the heat sink 204 as viewed from the X direction of FIG. 2. Note that, for easy understanding, FIG. 3 omits the light guide plate 102 and the like, and only illustrates the lower frame 201, the light sources 209, and the substrate 210 on which the light sources 209 are arranged. FIG. 4 omits the light sources 209, the substrate 210 on which the light sources 209 are arranged, and the like, and only illustrates the lower frame 201, the heat sink 204, the reflective sheet, and the light guide plate 102. In addition, FIGS. 3 and 4 illustrate a predetermined number of groove portions 301 for easy understanding, but in an actual case, for example, the heat sink 204 includes a plurality of groove portions 301 in the number corresponding to the number of the light sources 209.

As illustrated in FIG. 3, the heat sink 204 includes the plurality of groove portions 301 along the bottom wall portion 203 of the lower frame 201 in the direction extending from the respective light sources 209. In other words, the heat sink 204 includes the groove portions 301 on a surface that is opposite to the bottom wall portion 203 in the direction from the respective light sources 209 toward the light guide plate 102. As viewed from the cross section, for example, as illustrated in FIG. 4, the bottom portion 206 of the heat sink 204 includes the plurality of groove portions 301 as rectangular recessed portions at predetermined intervals.

Accordingly, as illustrated in FIG. 3, mainly in the case where the display device is used in the state in which the display panel is upright, such as when used as a liquid crystal display or the like, heat generated from each light source 209 is transferred to the air gap portion 211 of the protruding portion 207 of the lower frame 201 via each groove portion 301. Then, heat accumulated in the air gap portion 211 is dissipated to the outside via the lower frame 201. Note that, the heat transfer direction of FIG. 3 in this case is illustrated by an arrow 212 of FIG. 2. As indicated by an arrow 213, the heat generated from the light sources 209 is partially transferred also in the direction in which the display panel is arranged, but because this embodiment mainly assumes the case where the display device is used in the state in which the display panel is directed in the vertical direction (mainly in such a direction that the light source 209 faces downward with respect to the light guide plate 102) as described above, most of the heat generated from the light sources 209 is transferred in the direction of the arrow 212 via the groove portions 301.

It is desired that the width of each groove portion 301 be larger than, for example, the width of each light source 209. The groove portion 301 may be formed so that a cross-sectional width thereof becomes larger as being further away from the light source 209. In addition, the case where the groove portions 301 are formed at predetermined intervals has been described above, but, for example, the groove portions 301 may be formed at different intervals depending on the arrangement of the light sources 209.

Note that, as illustrated in FIG. 2, the reflective sheet, the light guide plate 102, the diffusion sheet 103, and the plurality of prism sheets 104 are arranged in this order from the bottom wall portion 203 side of the lower frame 201. Above the plurality of prism sheets 104 of FIG. 2, there are arranged a so-called TFT substrate (not shown) on which TFTs and the like are arranged, a counter substrate (not shown) on which a color filter and the like are arranged, and a display panel (not shown) including liquid crystal sealed by the two substrates. However, a detailed description thereof is omitted because those are well known.

As described above, this embodiment further decreases temperature of the vicinity of the light source 209 and thereby improves reliability of the light source 209. Specifically, for example, a change in characteristics of the light source 209 based on the heat generated from the light source 209 is prevented, and the life of the light source 209 is prolonged.

The present invention is not intended to be limited to the above-mentioned embodiment, and various modifications can be made. For example, the present invention may be replaced with substantially the same configuration as that illustrated in the above-mentioned embodiment, a configuration that provides the same functions and effects, or a configuration that achieves the same object.

Figure 5A:
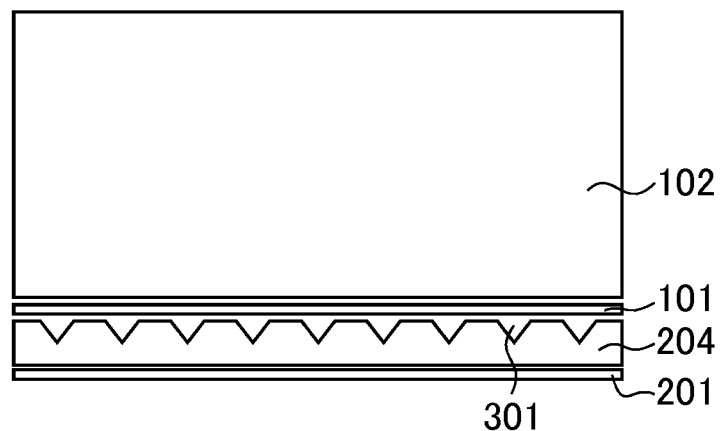
FIG. 5A is a diagram illustrating a modified example of groove portions of the heat sink.
Figure 5B:
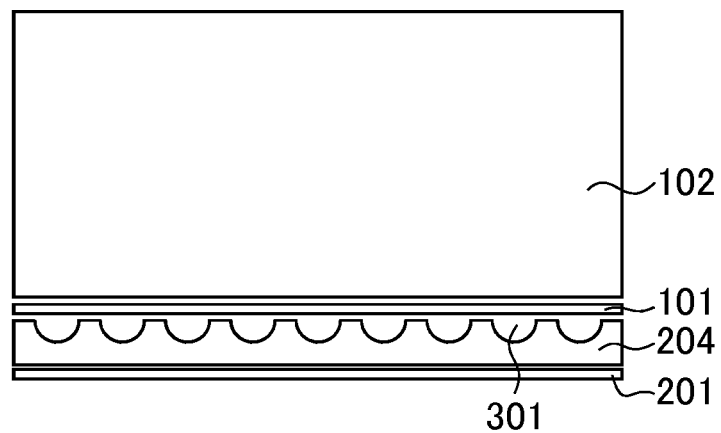
FIG. 5B is a diagram illustrating another modified example of the groove portions of the heat sink.

For example, the shape of the groove portion 301 is not limited to the above, and a different shape may be employed as long as the heat dissipation effect in the vicinity of the light source 209 is improved as described above. Specifically, for example, the cross-sectional shape of the groove portion 301 may be a triangular shape as illustrated in FIG. 5A. In this case, the groove portion 301 may be formed so as to have a wider width as being further away from the light source 209. In addition, a depth of the cross-sectional shape of the groove portion 301 may become larger as being closer to the center of the groove portion 301 as illustrated in FIG. 5B. Also in this case, the groove portion 301 may be formed so as to have a wider width as being further away from the light source 209. Note that, FIGS. 5A and 5B each schematically illustrate the cross section as viewed from the X direction of FIG. 2 similarly to FIG. 4.

Figure 6:
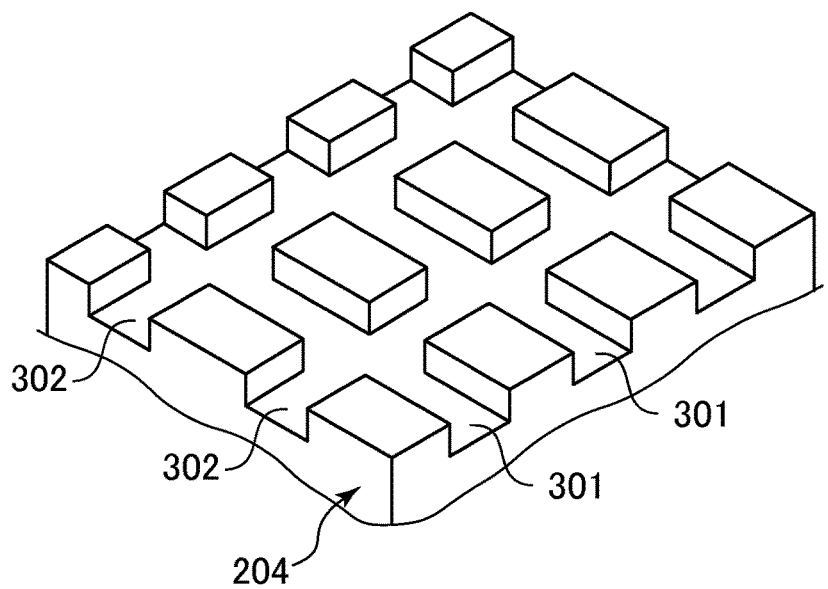
FIG. 6 is a diagram illustrating a heat sink in which intersecting groove portions are formed.

In addition, for example, as illustrated in FIG. 6, the heat sink 204 may include one or a plurality of groove portions 302 (intersecting groove portions 302) that intersect with the groove portions 301 described above. In this case, for example, when the display panel is used in the vertical direction, the heat is moved also in the horizontal direction, and hence the heat dissipation effect is further improved. In this case, as illustrated in FIG. 7, an intersecting groove portion 302 may be formed, which has an angle in the direction from the center of the heat sink 204 toward the outside when the display panel is used in the vertical direction.

Figure 7:
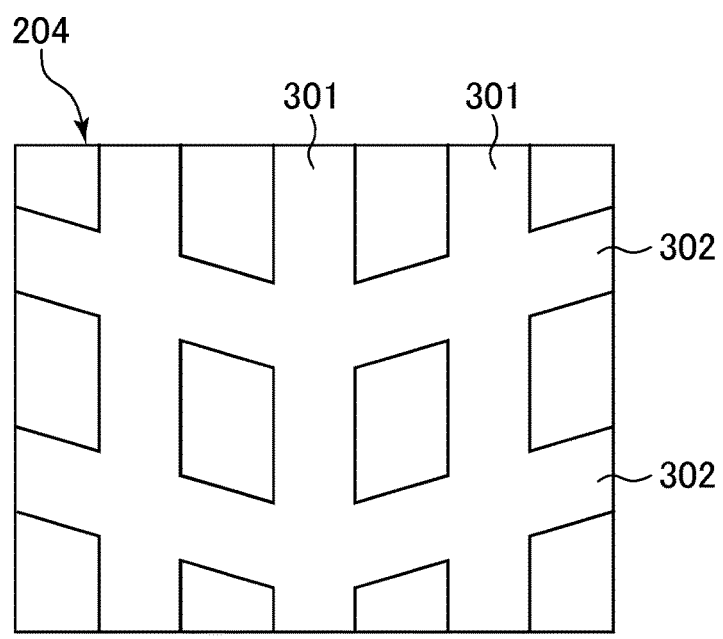
FIG. 7 is a diagram illustrating another example of the heat sink in which intersecting groove portions are formed.

Note that, FIG. 6 is a perspective diagram schematically illustrating the heat sink 204 in the case where the intersecting groove portions 302 are provided in the heat sink 204, and FIG. 7 is a plan view schematically illustrating the heat sink 204 in the case where the intersecting groove portions 302 are provided at the heat sink 204. For easy understanding, FIGS. 6 and 7 only illustrate predetermined numbers of the groove portions 301 and the intersecting groove portions 302. It should however be understood that the numbers of the groove portions 301 and the intersecting groove portions 302 may be different from each other.

Further, also in the cases illustrated in FIGS. 6 and 7, the cross-sectional shape of the intersecting groove portion 302 may be another shape than the above, and the intersecting groove portion 302 may be formed to have a width different from that of the groove portion 301. The plurality of intersecting groove portions 302 may be formed to have different widths.

In addition, the case where one groove portion 301 corresponds to each light source 209 has been mainly described above, but the groove portions 301 may be formed so that a plurality of light sources 209 correspond to one groove portion 301.

While what has been described above is the case where the light emitting diodes are used as the light sources 209, the present invention is not limited thereto and may instead use a so-called point light source. The display device according to this embodiment can be used as various kinds of display devices for information display, such as a personal computer display, a display for TV broadcast reception, and a display for advertisement display. The display device according to this embodiment can also be used as display devices of various kinds of electronic devices, such as a digital still camera, a video camera, a car navigation system, a car audio device, a game device, and a personal digital assistant.

The invention claimed is:

1. A display device, comprising:
a lower frame arranged on a side opposite to a display surface of a display panel, the lower frame comprising a bottom wall portion, and a side wall portion that is formed so as to surround the bottom wall portion at an edge thereof;
a plurality of light sources arranged along the side wall portion of the lower frame; and
a heat sink configured to dissipate heat generated from the plurality of light sources, wherein:
the bottom wall portion of the lower frame comprises a first recessed portion, a first protruding portion protruding from inside to outside the display device and a second recessed portion arranged in this order along a direction from the side wall portion toward the inside of the display device,
an air gap portion, at least part of which is surrounded by the first recessed portion, the first protruding portion and the second recessed portion is provided,
the heat sink comprises a plurality of groove portions that are formed along the bottom wall portion in a direction extending from the plurality of light sources, and
the plurality of groove portions are communicated with the air gap portion.

2. The display device according to claim 1, wherein the heat sink further comprises a side portion formed along the side wall portion of the lower frame, and a bottom portion formed along the bottom wall portion, and wherein the plurality of groove portions are formed at the bottom portion.

3. The display device according to claim 2, wherein the bottom portion of the heat sink further comprises an intersecting groove portion that intersects with the plurality of groove portions.

4. The display device according to claim 1, wherein each of the plurality of groove portions has a rectangular cross-sectional shape.

5. The display device according to claim 1, wherein each of the plurality of groove portions has a cross-sectional shape, and wherein a depth of the cross-sectional shape becomes larger toward a center thereof.

6. The display device according to claim 5, wherein each of the plurality of groove portions has a triangular cross-sectional shape.

7. The display device according to claim 5, wherein a width of the cross-sectional shape becomes larger as being further away from the plurality of light sources.

8. The display device according to claim 1, wherein a bottom portion of the heat sink overlaps the first recessed portion of the lower frame, but does not overlap the first protruding portion of the lower frame when viewed from above.

9. The display device according to claim 1, wherein a depth of the first recessed portion is smaller than a depth of the second recessed portion, with respect to the first protruding portion.

10. The display device according to claim 1, wherein an end of the heat sink reaches the air gap.

* * * * *